(12) United States Patent
Liu

(10) Patent No.: US 8,197,168 B2
(45) Date of Patent: Jun. 12, 2012

(54) CAPTIVE SCREW

(75) Inventor: Zhi-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 143 days.

(21) Appl. No.: 12/697,369

(22) Filed: Feb. 1, 2010

(65) Prior Publication Data

US 2011/0135422 A1 Jun. 9, 2011

(30) Foreign Application Priority Data

Dec. 4, 2009 (CN) .......................... 2009 1 0310941

(51) Int. Cl.
*F16B 39/00* (2006.01)
*F16B 21/18* (2006.01)

(52) U.S. Cl. ........................ 411/107; 411/999; 411/353

(58) Field of Classification Search .................. 411/352, 411/353, 107, 999, 542, 544; 267/152, 153
See application file for complete search history.

(56) References Cited

U.S. PATENT DOCUMENTS

| | | | | | |
|---|---|---|---|---|---|
| 2,439,516 | A | * | 4/1948 | Holcomb | 174/159 |
| 2,967,557 | A | * | 1/1961 | Tait et al. | 411/349 |
| 4,952,107 | A | * | 8/1990 | Dupree | 411/103 |
| 5,094,579 | A | * | 3/1992 | Johnson | 411/107 |
| 5,743,692 | A | * | 4/1998 | Schwarz | 411/353 |
| 5,851,095 | A | * | 12/1998 | Ellis et al. | 411/353 |
| 6,030,161 | A | * | 2/2000 | Udell et al. | 411/353 |
| 6,059,503 | A | * | 5/2000 | Johnson | 411/353 |
| 6,871,431 | B2 | * | 3/2005 | Schmidt | 40/200 |

* cited by examiner

*Primary Examiner* — Victor Batson
*Assistant Examiner* — James Cline, Jr.
(74) *Attorney, Agent, or Firm* — Altis Law Group, Inc.

(57) ABSTRACT

A captive screw includes a screw member and a tubular elastic member. The screw member includes a threaded post and a screw head positioned at an end of the threaded post. The tubular elastic member is sleeved on the threaded post and is tightly fitted with the threaded post. The tubular elastic member further includes a fold formed on the outer surface and spirally extending from one end of the tubular elastic member to the other.

12 Claims, 5 Drawing Sheets

CAPTIVE SCREW

BACKGROUND

1. Technical Field

The present disclosure relates to screws and, particularly, to a captive screw.

2. Description of the Related Art

A commonly used captive screw includes a threaded post, a screw head formed on an end of the threaded post and a spring sleeved on the threaded post. One end of the spring is fixed on the screw head. The captive screw can be used for fixing a front plate to a main body of an electronic device. The front plate defines a mounting hole; the main body defines a threaded hole corresponding to the threaded post. The threaded post is passed through the mounting hole, and received in the threaded hole. One end of the spring resists the screw head and the other end resists the front plate, thereby locking the front plate onto the main body.

However, when the electronic device is exposed to the elements, water and dust may acquire access inside the gap between the threaded post and a side surface of the mounting hole or a side surface of the threaded hole, leading to deterioration of the threaded post, thereby presenting difficulty when the front plate is to be detached from the main body.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
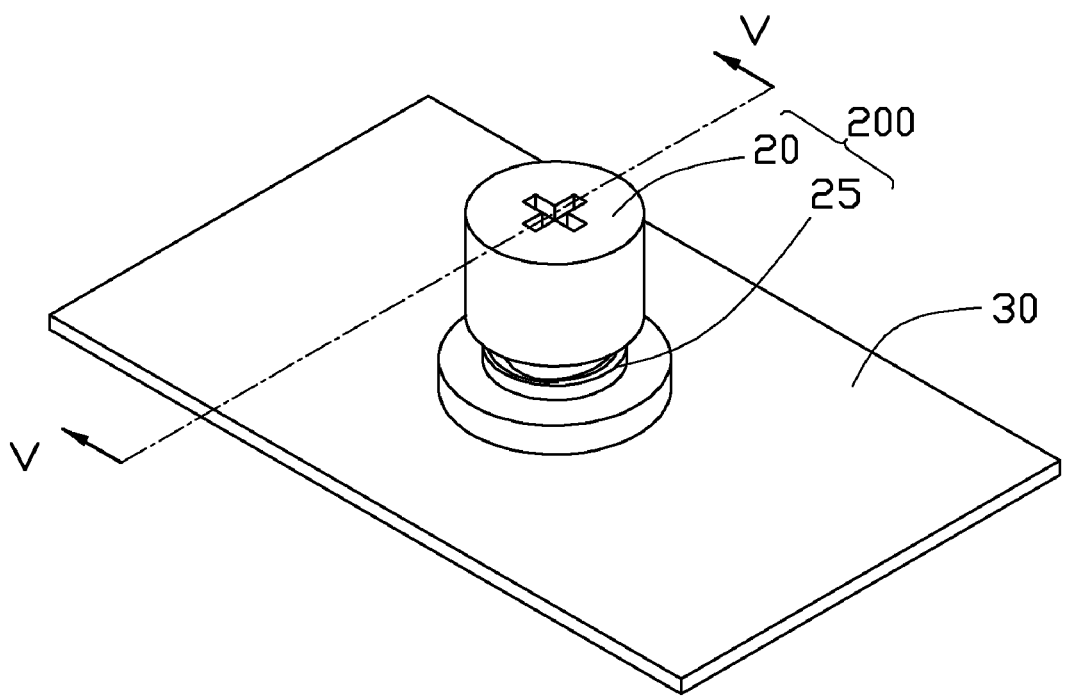
FIG. 1 is an isometric view of an embodiment of a captive screw mounted on a front plate.

Referring to FIG. 1, an embodiment of a connecting assembly 100 includes a captive screw 200 and a front plate 30 detachably assembled with the captive screw 200. The captive screw 200 may be used to fix a front plate 30 to a main body of an electronic device (not shown). The captive screw 200 includes a screw member 20 and a tubular elastic member 25.

Figure 2:
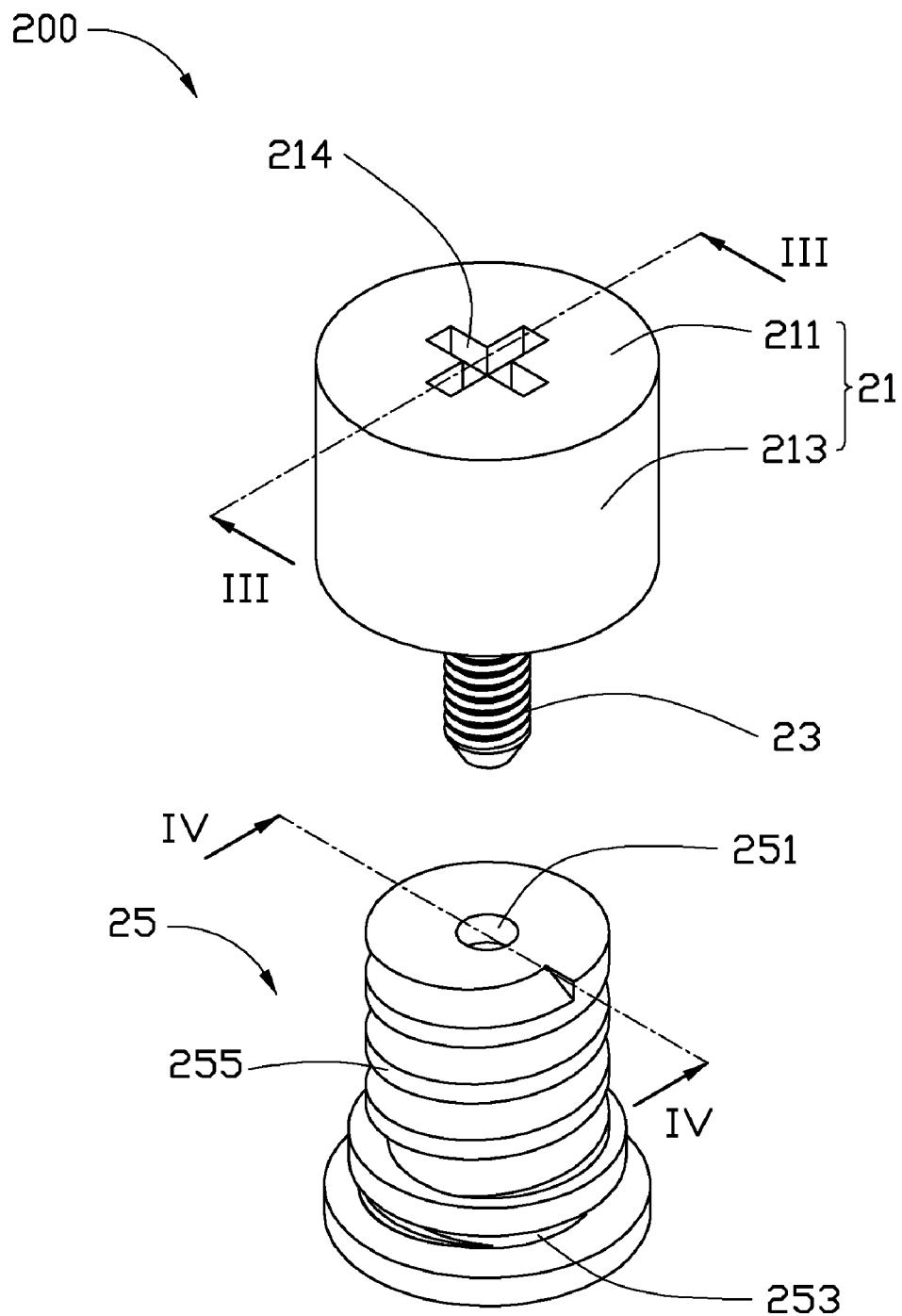
FIG. 2 is an exploded, isometric view of the captive screw of FIG. 1; the captive screw including a screw and a tubular elastic member.
Figure 3:
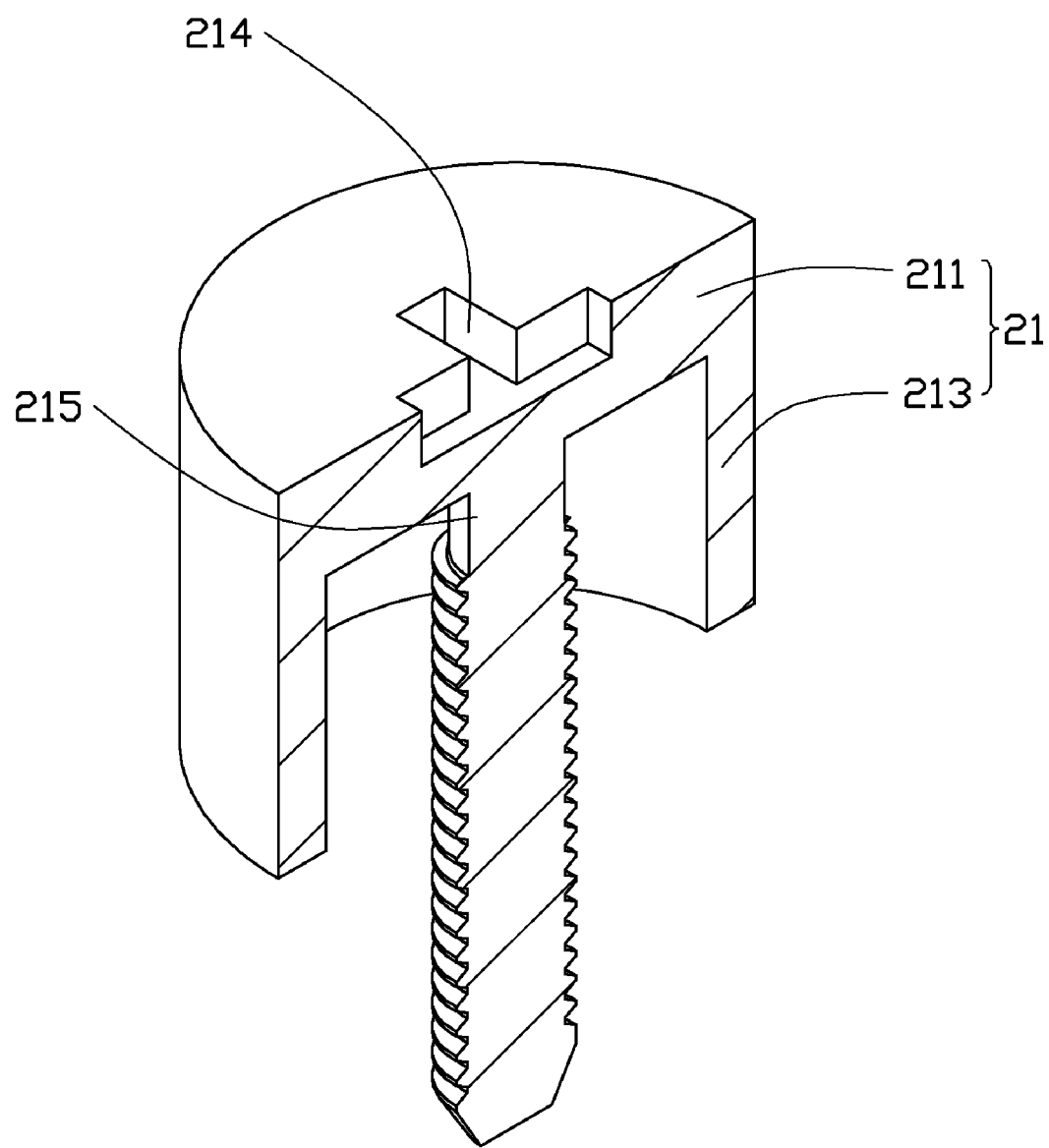
FIG. 3 is a cross-section of the screw member shown in FIG. 2, taken along the line III-III.
Figure 4:
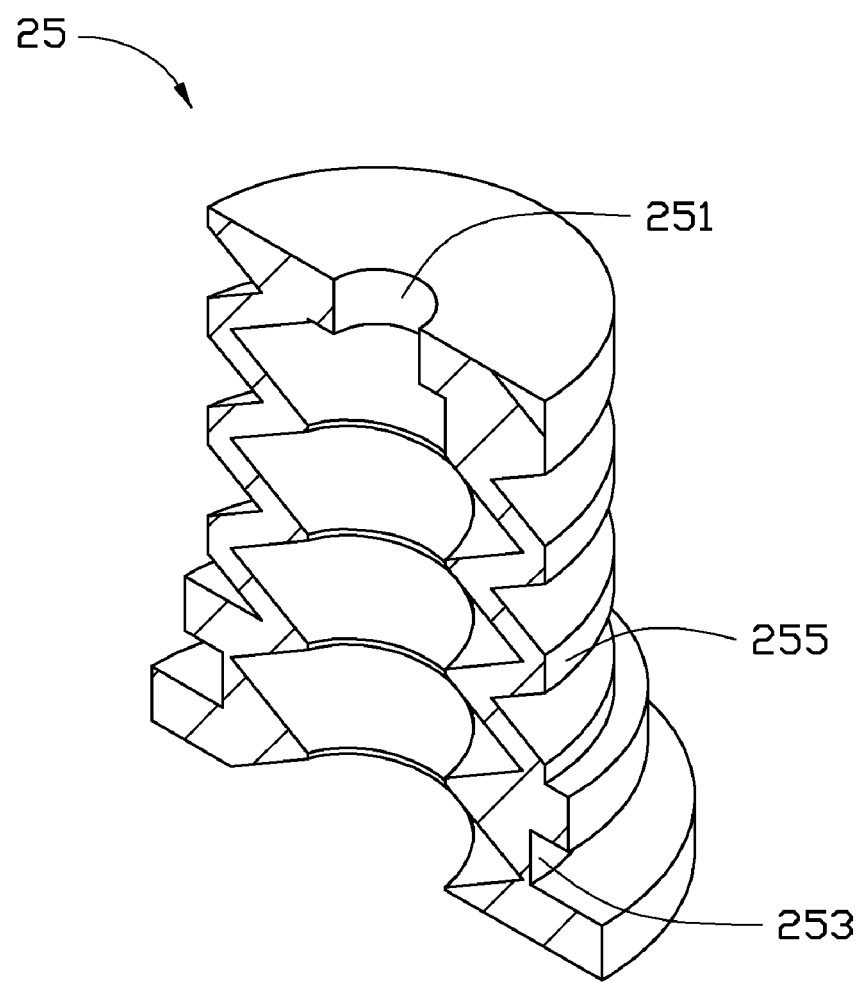
FIG. 4 is a cross-section of the tubular elastic member shown in FIG. 2, taken along the line IV-IV.

Referring to FIGS. 2 to 4, the screw member 20 includes a screw head 21 and a threaded post 23. The screw head 21 includes a circular main plate 211 formed on an end of the threaded post 23 and a protecting sidewall 213 extending substantially perpendicularly from a periphery of the main plate 211 parallel to the threaded post 23. The protecting sidewall 213 and the threaded post 23 are located on the same side of the main plate 211. The protecting sidewall 213 surrounds the threaded post 23. The main plate 211 defines a recess slot 214 in the form of philip slot in a surface away from the threaded post 23 accessible to a tool, such as a screwdriver (not shown) to install and remove the main plate 211. The protecting sidewall 213 is shorter than the threaded post 23, such that an end of the threaded post 23 away from the main plate 211 extends out of the protecting sidewall 213. The threaded post 23 defines a fixing portion 215 adjacent to the main plate 211 to fix the tubular elastic member 25. A diameter of the fixing portion 215 is slightly less than that of the other part of the threaded post 23.

The tubular elastic member 25 is made of rubber. The tubular elastic member 25 defines a fixing hole 251 at an end thereof. A diameter of the fixing hole 251 is slightly less than that of the fixing portion 215 of the threaded post 23. The tubular elastic member 25 further includes an annular latching slot 253 defined in an outer surface adjacent to the other end of the tubular elastic member 25 away from the fixing hole 251. The tubular elastic member 25 further includes a fold 255 formed on the outer surface and spiraling from one end of the tubular elastic member 25 to the other, to enhance the flexibility of the tubular elastic member 25.

The threaded post 23 passes through the fixing hole 251, which correspondingly deforms and permits the threaded post 23 to pass therethough, such that the tubular elastic member 25 is fixed to the fixing portion 215 and surrounded by the protecting sidewall 213. The fixing portion 215 may be glued to the side surface of the fixing hole 251 to prevent the tubular elastic member 25 from being detached from the threaded post 23. An end of the threaded post 23 away from the screw head 21 extends out of the tubular elastic member 25.

Figure 5:
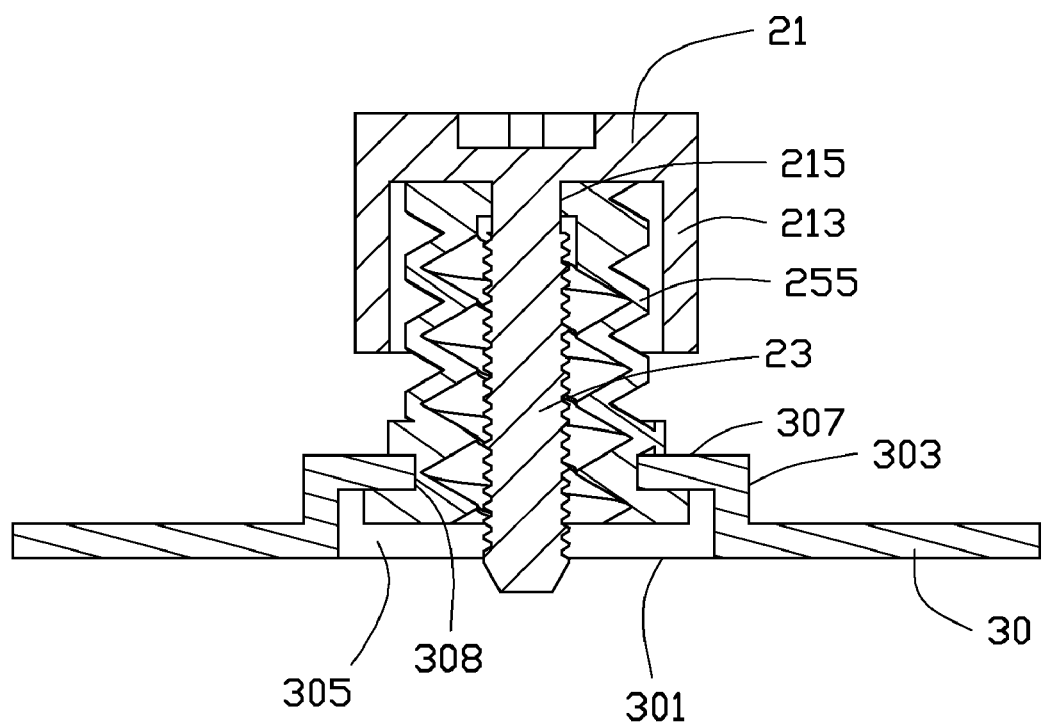
FIG. 5 is a cross-section of the captive screw and the front plate, taken along the line V-V.

Referring to FIG. 5 again, the front plate 30 defines a mounting hole 301, and forms a wall 303 extending from the periphery of the mounting hole 301. The front plate 30 further includes an annular latching portion 307 which extends from a free end of the wall 303 inwardly. The latching portion 307 defines a latching hole 308 therein. The wall 303 and the latching portion 307 cooperatively define a receiving chamber 305. The main body (not shown) defines a threaded hole (not shown) corresponding to the threaded post 23.

The end of the tubular elastic member 25 away from the screw head 21 is deformed and received in the latching hole 308, to fix the latching portion 307 in the latching slot 253 of the tubular elastic member 25. The threaded post 23 passes through the latching hole 308 and is finally received in the threaded hole, thus compressing the tubular elastic member 25. One end of the tubular elastic member 25 resists the front plate 30 and tightly covers the front plate 30 around the latching hole 308; the other end of the tubular elastic member 25 resists the screw head 21 and tightly connects to the threaded post 23, such that a sealed chamber is defined in the tubular elastic member 25, preventing contamination of the threaded post 23. Since the tubular elastic member 25 is rubber, the tubular elastic member 25 rotates smoothly in the latching hole 308 when the threaded post 23 is received in the threaded hole. When the threaded post 23 is disengaged from the threaded hole, to remove the front plate 30 from the main body, the latching portion 307 remains in the latching slot 253, such that the captive screw 200 is not lost when the front plate 30 is detached from the main body.

In another embodiment, the tubular elastic member 25 can forego or do without the latching slot 253, and the latching hole 308 can be directly defined in the front plate 30. The end of the tubular elastic member 25 away from the fixing hole 251 can be directly abutting the front plate 30 and also covering around the latching hole 308 for forming a substantial seal between the front plate 30 and the main body.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:

1. A captive screw comprising:
   a screw member comprising a threaded post and a screw head formed on an end of the threaded post; and
   a tubular elastic member sleeved on and tightly fitting around the threaded post, and the tubular elastic member comprising a fold formed on an outer surface of the tubular elastic member and spirally extending in the axial direction of the tubular elastic member, and an annular latching slot defined in the outer surface of the tubular elastic member and positioned adjacent to an end of the fold away form the screw head.

2. The captive screw of claim 1, wherein the tubular elastic member defines a fixing hole at one end thereof, and the threaded post forms a fixing portion adjacent to the screw head.

3. The captive screw of claim 2, wherein a diameter of the fixing hole is slightly less than that of the fixing portion, such that the fixing portion is tightly fit with a side surface of the fixing hole.

4. The captive screw of claim 3, wherein a side surface of the fixing hole is adhered to the fixing portion using glue.

5. The captive screw of claim 1, wherein the screw head comprises a main plate and a protecting sidewall, and the protecting sidewall extending at a periphery of the main plate and surrounding the threaded post.

6. The captive screw of claim 1, wherein the screw head defines a recess slot at a surface away from the threaded post.

7. A connecting assembly comprising:
   a front plate defining a mounting hole and comprising a wall extending from the periphery of the mounting hole and an annular latching portion extending from a free end of the wall inwardly; the latching portion defining a latching hole coaxially communicating with the mounting hole; and
   a captive screw comprising:
      a screw member comprising a threaded post and a screw head formed on an end of the threaded post; and
      a tubular elastic member sleeved on the threaded post, the tubular elastic member comprising a fold formed on the outer surface of the tubular elastic member and spirally extending in the axial direction of the tubular elastic member, and an annular latching slot defined in an outer surface of the tubular elastic member and positioned adjacent to an end of the fold away from the screw head;
   wherein one end of the tubular elastic member away from the screw head is deformed and received in the latching hole of the front plate, and the latching portion is fixed in the latching slot of the tubular elastic member; the threaded post passes through the latching hole and partially received in the mounting hole, one end of the tubular elastic member resists the front plate and tightly covers the front plate around the latching hole, the other end of the tubular elastic member resists the screw head and tightly connects to the threaded post.

8. The connecting assembly of claim 7, wherein the tubular elastic member defines a fixing hole at one end thereof, and the threaded post forms a fixing portion adjacent to the screw head.

9. The connecting assembly of claim 8, wherein a diameter of the fixing hole is slightly less than that of the fixing portion, such that the fixing portion is tightly fit with a side surface of the fixing hole.

10. The connecting assembly of claim 9, wherein a side surface of the fixing hole is adhered to the fixing portion using glue.

11. The connecting assembly of claim 7, wherein the screw head comprises a main plate and a protecting sidewall, and the protecting sidewall extending at a periphery of the main plate and surrounding the threaded post.

12. The connecting assembly of claim 7, wherein the screw head defines a recess slot at a surface away from the threaded post.

* * * * *